US009705631B2

(12) United States Patent
Hashimoto

(10) Patent No.: US 9,705,631 B2
(45) Date of Patent: Jul. 11, 2017

(54) TRANSMISSION/RECEPTION DEVICE, OPTICAL SPACE TRANSMISSION SYSTEM, AND TRANSMISSION/RECEPTION METHOD

(71) Applicant: NEC Corporation, Minato-ku, Tokyo (JP)

(72) Inventor: Yoichi Hashimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 141 days.

(21) Appl. No.: 14/771,856

(22) PCT Filed: Mar. 3, 2014

(86) PCT No.: PCT/JP2014/001124
§ 371 (c)(1),
(2) Date: Sep. 1, 2015

(87) PCT Pub. No.: WO2014/136421
PCT Pub. Date: Sep. 12, 2014

(65) Prior Publication Data
US 2016/0013882 A1  Jan. 14, 2016

(30) Foreign Application Priority Data

Mar. 4, 2013 (JP) .................................. 2013-041833

(51) Int. Cl.
*H04B 10/11* (2013.01)
*H04B 10/40* (2013.01)
(Continued)

(52) U.S. Cl.
CPC ............ *H04J 14/06* (2013.01); *H04B 10/118* (2013.01); *H04B 10/1123* (2013.01)

(58) Field of Classification Search
CPC ..... H04B 10/118; H04B 10/1123; H04J 14/06
(Continued)

(56) References Cited

U.S. PATENT DOCUMENTS 4,199,226 A * 4/1980 Weber .................... G01B 11/00
359/260
4,825,113 A * 4/1989 Sato ..................... G02B 6/4246
398/139
(Continued)

FOREIGN PATENT DOCUMENTS

GB  2271034 A  3/1994
JP  H11355215 A  12/1999
(Continued)

OTHER PUBLICATIONS

International Search Report for PCT Application No. PCT/JP2014/001124, mailed on Mar. 25, 2014.
(Continued)

*Primary Examiner* — Ken N Vanderpuye
*Assistant Examiner* — Dibson Sanchez

(57) ABSTRACT

In a digital coherent communication scheme utilizing polarization-multiplexed optical signals, it may be impossible to separate transmission light and reception light from each other with high precision for transmission/reception an optical signal. An optical space transmission system according to the present invention is provided with a first transmission/reception device which radiates first reception light and second reception light whose polarization states are orthogonal to each other, and a second transmission/reception device which radiates third reception light alternately including a first reception light component whose polarization state is the same as the first reception light and a second reception light component whose polarization state is the same as the second reception light in a time-wise manner.

10 Claims, 8 Drawing Sheets

OPTICAL SPACE TRANSMISSION SYSTE 10

(51) Int. Cl.
*H04J 14/06* (2006.01)
*H04B 10/118* (2013.01)
*H04B 10/112* (2013.01)

(58) Field of Classification Search
USPC .......................... 398/65, 118–131, 135–139
See application file for complete search history.

(56) References Cited

U.S. PATENT DOCUMENTS

| | | | | | |
|---|---|---|---|---|---|
| 5,113,403 | A * | 5/1992 | Block | ................. | H04B 10/803 398/118 |
| 5,204,866 | A * | 4/1993 | Block | ................. | H04B 10/803 398/118 |
| 5,210,643 | A * | 5/1993 | Fujii | ................. | G02B 27/1006 359/618 |
| 5,212,594 | A * | 5/1993 | Joynes | ................. | G02B 27/283 359/485.05 |
| 5,392,459 | A * | 2/1995 | Baba | ................. | H04W 52/42 342/361 |
| 5,500,754 | A * | 3/1996 | Orino | ................. | H04B 10/40 398/128 |
| 5,506,716 | A * | 4/1996 | Mihara | ................. | H04B 10/1125 398/136 |
| 5,530,577 | A * | 6/1996 | Orino | ................. | H04B 10/40 398/129 |
| 5,600,487 | A * | 2/1997 | Kiyomoto | ................. | G02B 5/0833 359/586 |
| 5,809,184 | A * | 9/1998 | Doerr | ................. | G02B 6/12016 398/212 |
| 6,038,357 | A * | 3/2000 | Pan | ................. | H04J 14/02 385/11 |
| 6,330,092 | B1 * | 12/2001 | Aronson | ................. | H04B 10/11 398/119 |
| 6,414,773 | B1 * | 7/2002 | Masuzawa | ................. | H04B 10/1141 398/152 |
| 6,434,363 | B2 * | 8/2002 | Rinne | ................. | H04B 10/11 398/65 |
| 6,580,535 | B1 * | 6/2003 | Schonfelder | ................. | H04J 14/06 398/152 |
| 6,650,450 | B1 * | 11/2003 | Orino | ................. | H04B 10/40 398/140 |
| 6,798,558 | B2 * | 9/2004 | Hayashi | ................. | G02F 3/00 398/147 |
| 6,968,133 | B2 * | 11/2005 | Sakanaka | ................. | H04B 10/1127 398/122 |
| 7,106,971 | B1 * | 9/2006 | Davis | ................. | H04B 10/1125 398/121 |
| 2001/0043379 | A1 * | 11/2001 | Bloom | ................. | H04B 10/2587 398/128 |
| 2001/0051505 | A1 * | 12/2001 | Rinne | ................. | H04B 10/11 455/66.1 |
| 2002/0080452 | A1 * | 6/2002 | Sakanaka | ................. | H04B 10/11 398/121 |
| 2003/0091261 | A1 * | 5/2003 | Wu | ................. | G02B 6/2706 385/11 |
| 2003/0147652 | A1 * | 8/2003 | Green | ................. | H04Q 11/0005 398/118 |
| 2003/0175033 | A1 * | 9/2003 | Taga | ................. | H04J 14/06 398/152 |
| 2006/0251421 | A1 * | 11/2006 | Arnon | ................. | H04B 7/10 398/73 |
| 2008/0138070 | A1 * | 6/2008 | Yan | ................. | H04J 14/06 398/65 |
| 2010/0008679 | A1 * | 1/2010 | Cole | ................. | H04B 10/40 398/185 |
| 2010/0196008 | A1 * | 8/2010 | Szafraniec | ................. | H04B 10/2569 398/65 |
| 2010/0329669 | A1 * | 12/2010 | Cunningham | ................. | H04B 10/40 398/41 |
| 2011/0085802 | A1 * | 4/2011 | Bernasconi | ................. | H04J 14/06 398/65 |
| 2012/0051756 | A1 * | 3/2012 | Grobe | ................. | H04B 10/5167 398/184 |
| 2013/0034196 | A1 * | 2/2013 | Vann | ................. | H04B 7/002 375/350 |

FOREIGN PATENT DOCUMENTS

| | | |
|---|---|---|
| JP | 2000216462 A | 8/2000 |
| JP | 2007074273 A | 3/2007 |
| WO | 0188571 A2 | 11/2001 |

OTHER PUBLICATIONS

English translation of Written opinion for PCT Application No. PCT/JP2014/001124.

Neda Cvijetic, Dayou Qian, Jianjun Yu, Yue-Kai Huang, and Ting Wang, "Polarization-Multiplexed Optical Wireless Transmission With Coherent Detection", Journal of Lightwave Technology, Apr. 15, 2010, vol. 28 No. 8, pp. 1218-1227.

* cited by examiner

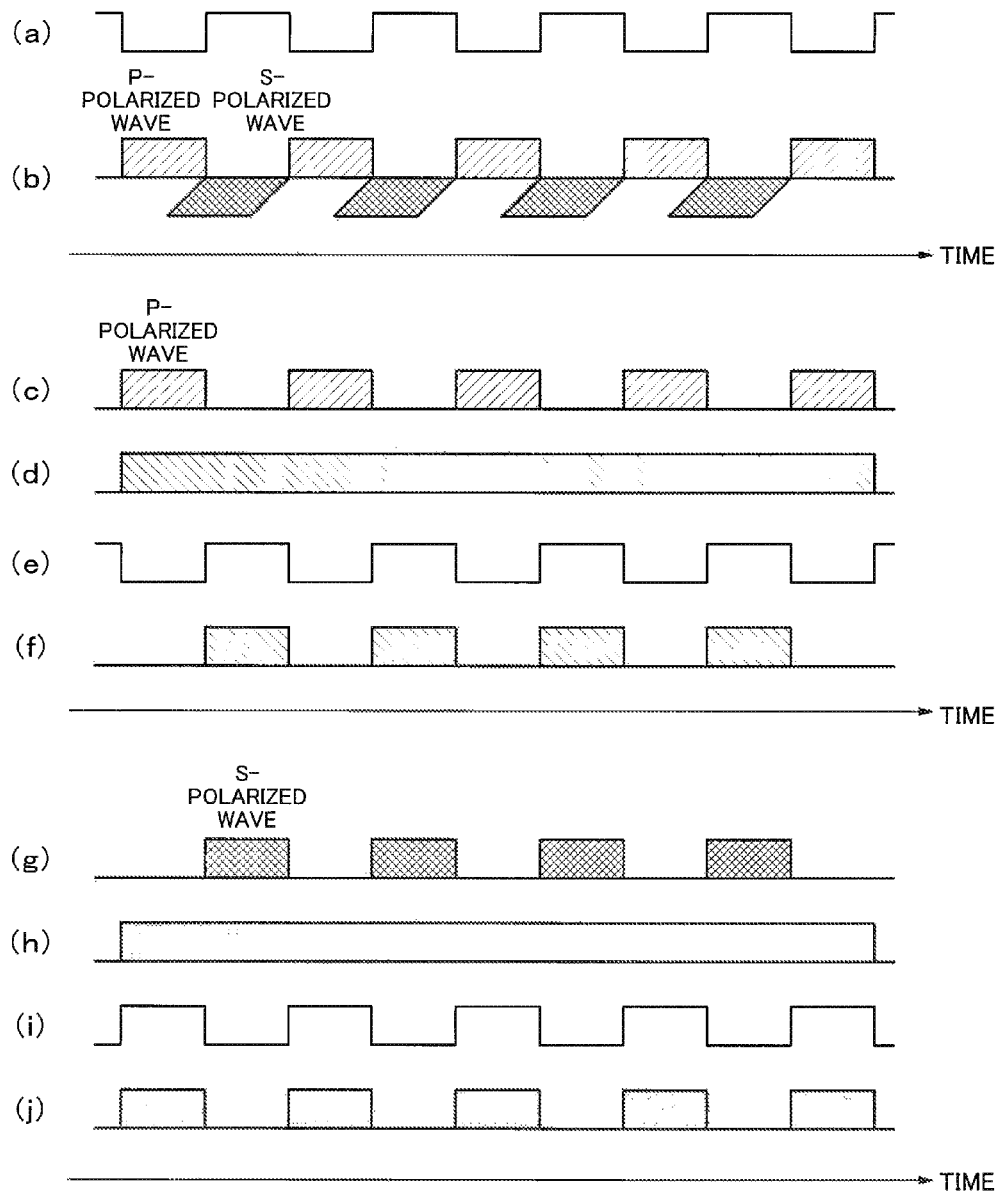

TRANSMISSION/RECEPTION DEVICE, OPTICAL SPACE TRANSMISSION SYSTEM, AND TRANSMISSION/RECEPTION METHOD

This application is a National Stage Entry of PCT/JP2014/001124 filed on Mar. 3, 2014, which claims priority from Japanese Patent Application 2013-041833 filed on Mar. 4, 2013, the contents of all of which are incorporated herein by reference, in their entirety.

TECHNICAL FIELD

The present invention relates to a transmission/reception device, an optical space transmission system, and a transmission/reception method for transmission/reception polarization-multiplexed optical signal. In particular, the present invention relates to a transmission/reception device, an optical space transmission system, and a transmission/reception method for use in communication between a flying object such as a satellite or an airplane, and a ground base station.

BACKGROUND ART

In optical space communication, particularly, in ultra-long-distance optical space transmission such as optical space communication between satellites, it is general to use transmission light in a single polarization state. This is in order to perform bi-directional communications, in which a single optical link path is established in the free space by tracking transmission light released from the own station and transmission light released from a partner station with use of an optical antenna of the own station and an optical antenna of the partner station.

In the ultra-long-distance optical space transmission, it is necessary to separate, in a wide dynamic range, transmission light of a strong optical power transmitted by the own station from reception light of a weak optical power transmitted by the partner station. As some of the methods, there are proposed a method in which transmission light and reception light are separated from each other by using wavelengths different from each other, a method in which transmission light and reception light are separated from each other depending on a polarization state of transmission light of the own station and a polarization state of transmission light of the partner station, and a method in which the aforementioned methods are combined.

For instance, PTL 1 discloses a technique, in which transmission light of a strong optical power transmitted by the own station and reception light of a weak optical power transmitted by the partner station are separated from each other depending on a polarization state. FIG. 6 is a block configuration diagram of an optical space communication device of PTL 1. An optical space communication device 90 illustrated in FIG. 6 is configured such that linearly polarized transmission light generated in an optical transmitter 91 is separated by a beam splitter 93 depending on a polarization state, P-polarized transmission light is output to an optical monitor 94, and S-polarized transmission light is output to a collimator lens 95.

The optical monitor 94 adjusts the optical axis of a transmitted beam, based on the input P-polarized transmission light. On the other hand, the S-polarized transmission light output to the collimator lens 95 is collimated into parallel light beams by the collimator lens 95. Thereafter, the parallel light beams are converted into circularly polarized light by a quarter wave plate 96. After the beam diameter of the circularly polarized light is expanded by a sub mirror 97 and a main mirror 98, the expanded beam is released into the free space.

Further, when circularly polarized reception light is irradiated from the partner station, the optical space communication device 90 illustrated in FIG. 6 reduces the beam diameter of the irradiated reception light by the main mirror 98 and the sub mirror 97, and converts the circularly polarized light into linearly polarized light by the quarter wave plate 96. Further, the converted linearly polarized reception light is collimated into a parallel light flux by the collimator lens 95. Thereafter, the parallel light flux is input to the beam splitter 93 and is transmitted through an optical receiver 92 based on the polarization state for demodulation.

CITATION LIST

Patent Literature

PTL 1: Japanese Laid-open Patent Publication No. 2000-216462

SUMMARY Of INVENTION

Technical Problem

A digital coherent optical communication scheme is paid attention to, as an optical communication technique to be applied to a next-generation optical fiber network for land and marine use. In view of high-sensitivity receiving characteristics and usability of digital signal processing such as Doppler frequency shift correction, research has progressed about application of the digital coherent optical communication scheme to ultra-long-distance optical space transmission between a flying object such as a satellite or an airplane, and a ground base station.

However, it is impossible to apply the optical space communication device 90 described in PTL 1 to the digital coherent technique, as it is. This is because the digital coherent technique is based on the premise of using polarization-multiplexed optical signal obtained by combining signal light having two polarization states orthogonal to each other.

The optical space communication device 90 described in PTL 1 separates transmission light of a strong optical power transmitted by the own station from reception light of a weak optical power transmitted by the partner station depending on a polarization state. When the digital coherent technique is applied to the optical space communication device 90 to separate transmission light and reception light from each other depending on a polarization state, it is highly difficult to demodulate a signal by a digital signal processing unit after coherent receiving. In particular, the probability of occurrence of failure is high in a polarization demultiplexer circuit in which signal components, each of which has polarization states orthogonal to each other, are concurrently required, or in an error correction circuit in which the error correctability is enhanced by enlarging the communication frame structure.

In view of the aforementioned problems, an object of the invention is to provide a transmission/reception device, an optical space transmission system, and a transmission/reception method which enable to separate transmission light and reception light from each other with high precision for transmission/reception an optical signal even in a digital coherent communication scheme employing polarization-multiplexed optical signal.

Solution to Problem

A first transmission/reception device of the invention that accomplishes the aforementioned object is provided with an antenna unit which is irradiated with reception light alternately including a first reception light component and a second reception light component whose polarization states are orthogonal to each other in a time-wise manner, and which radiates first transmission light having a polarization state orthogonal to the polarization state of the first reception light component, and second transmission light having a polarization state orthogonal to the polarization state of the second reception light component in a predetermined direction into an external space; a first transmitter which generates the first transmission light; a second transmitter which generates the second transmission light; a first polarization multiplexer/demultiplexer circuit which separates the irradiated reception light and the generated first transmission light from each other depending on a polarization state, and outputs the first reception light component and the first transmission light in directions different from each other on one axis; a second polarization multiplexer/demultiplexer circuit which separates the irradiated reception light and the generated second transmission light from each other depending on a polarization state, and outputs the second reception light component and the second transmission light in directions different from each other on one axis; and a receiver which combines the output first reception light component and the output second reception light component for processing.

A second transmission/reception device of the invention that accomplishes the aforementioned object is provided with an antenna unit which is irradiated with first reception light and second reception light whose polarization states are orthogonal to each other, and which radiates third transmission light into an external space; a transmitter which generates signal light; a modulator which modulates the generated signal light into signal light alternately including a first transmission light component having a polarization state orthogonal to the polarization state of the first reception light, and a second transmission light component having a polarization state orthogonal to the polarization state of the second reception light in a time-wise manner; a polarization demultiplexer circuit which separates the modulated signal light depending on a polarization state, and extracts the first transmission light component and the second transmission light component; a first multiplexer/demultiplexer circuit which outputs the extracted first transmission light component and the first reception light in directions different from each other on one axis; a second multiplexer/demultiplexer circuit which outputs the extracted second transmission light component and the second reception light in directions different from each other on one axis; a polarization multiplexer/demultiplexer circuit which separates the first reception light and the second reception light from each other depending on a polarization state to output the first reception light and the second reception light to the first multiplexer/demultiplexer circuit and to the second multiplexer/demultiplexer circuit, respectively, and which combines the first transmission light component output from the first multiplexer/demultiplexer circuit and the second transmission light component output from the second multiplexer/demultiplexer circuit to output the combined light as the third transmission light to the antenna unit; and a receiver which combines the first reception light output from the first multiplexer/demultiplexer circuit, and the second reception light output from the second multiplexer/demultiplexer circuit for processing.

An optical space transmission system of the invention that accomplishes the aforementioned object is provided with the first transmission/reception device described above which is configured to radiate first signal light and second signal light whose polarization states are orthogonal to each other; and the second transmission/reception device described above which is configured to radiate third signal light alternately including a first signal light component whose polarization state is the same as the polarization state of the first signal light, and a second signal light component whose polarization state is the same as the polarization state of the second signal light in a time-wise manner.

A first transmission/reception method of the invention that accomplishes the aforementioned object includes irradiating reception light alternately including a first reception light component and a second reception light component whose polarization states are orthogonal to each other in a time-wise manner; generating first transmission light having a polarization state orthogonal to the polarization state of the first reception light component; generating second transmission light having a polarization state orthogonal to the polarization state of the second reception light component; separating the irradiated reception light and the generated first transmission light from each other based on a polarization state; outputting the first reception light component and the first transmission light in directions different from each other on one axis; separating the irradiated reception light and the generated second transmission light from each other based on a polarization state; outputting the second reception light component and the second transmission light in directions different from each other on one axis; radiating each of the output first transmission light and the output second transmission light in a predetermined direction into an external space; and combining the output first reception light component and the output second reception light component for processing.

A second transmission/reception method of the invention that accomplishes the aforementioned object includes irradiating first reception light and second reception light whose polarization states are orthogonal to each other; separating the irradiated first reception light and the irradiated second reception light from each other depending on a polarization state; generating transmission light; modulating the generated transmission light into transmission light alternately including a first transmission light component having a polarization state orthogonal to the polarization state of the first reception light, and a second transmission light component having a polarization state orthogonal to the polarization state of the second reception light in a time-wise manner; separating the modulated transmission light depending on a polarization state; extracting the first transmission light component and the second transmission light component; outputting the extracted first transmission light component and the separated first reception light in directions different from each other on one axis; outputting the extracted second transmission light component and the separated second reception light in directions different from each other on one axis; combining the output first transmission light component and the output second transmission light component to radiate the combined light into an external space; and processing the output first reception light and the output second reception light.

Advantageous Effects of Invention

According to the aspects of the invention as described above, it is possible to separate transmission light and reception light from each other with high precision for transmission/reception an optical signal even in a digital coherent communication scheme employing polarization-multiplexed optical signal.

BRIEF DESCRIPTION OF DRAWINGS

FIG. 4 is a diagram for describing a gate control method of angle detectors 841 and 842 of the transmission/reception device 500 according to the third exemplary embodiment;

DESCRIPTION OF EMBODIMENTS (First Exemplary Embodiment)

Figure 1:
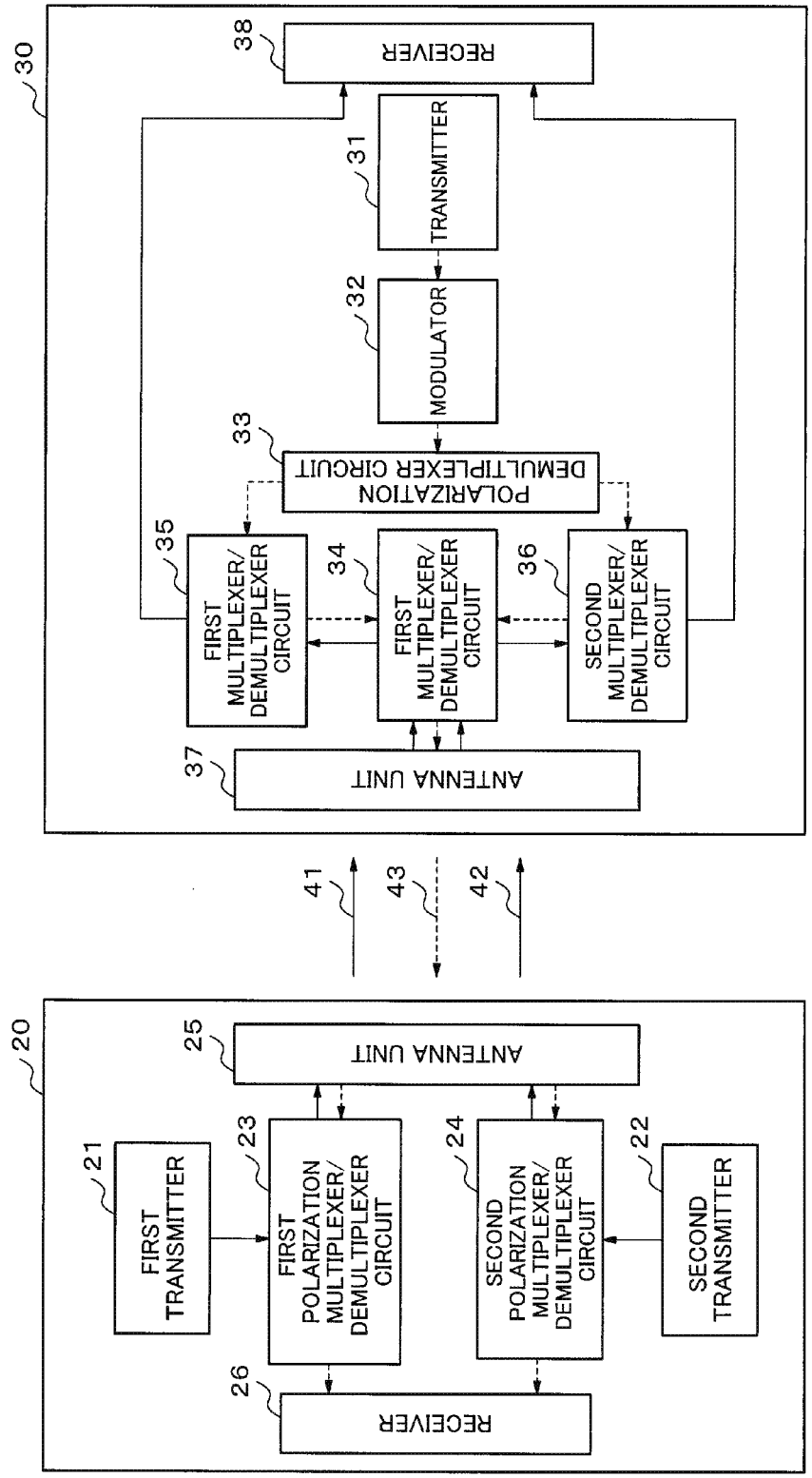
FIG. 1 is a system configuration diagram of an optical space transmission system 10 according to a first exemplary embodiment.

A first exemplary embodiment of the invention is described. FIG. 1 is a system configuration diagram of an optical space transmission system according to the exemplary embodiment. In FIG. 1, an optical space transmission system 10 is constituted of a first transmission/reception device 20 and a second transmission/reception device 30.

In the exemplary embodiment, it is assumed that optical communication is performed between a satellite and the ground. Specifically, a terminal station on a satellite where a large amount of information is held, and the information is required to be transmitted is defined as the first transmission/reception device 20, and a terminal station on the ground as a partner station where the large amount of information is received is defined as the second transmission/reception device 30.

It is assumed that information to be transmitted from the second transmission/reception device 30 to the first transmission/reception device 20 is control information such as a re-transmission request signal, and that the amount of information to be transmitted from the second transmission/reception device 30 to the first transmission/reception device 20 is small, as compared with the amount of information to be transmitted from the first transmission/reception device 20 to the second transmission/reception device 30.

The first transmission/reception device 20 radiates first signal light 41 and second signal light 42 whose polarization states are orthogonal to each other toward the second transmission/reception device 30. Further, the first transmission/reception device 20 is irradiated with third signal light 43 alternately including a first reception light component and a second reception light component whose polarization states are orthogonal to each other in a time-wise manner from the second transmission/reception device 30.

The polarization state of the first signal light 41 and the polarization state of the first reception light component of the third signal light 43 are orthogonal to each other, and the polarization state of the second signal light 42 and the polarization state of the second reception light component of the third signal light 43 are orthogonal to each other. As illustrated in FIG. 1, the first transmission/reception device 20 is provided with a first transmitter 21, a second transmitter 22, a first polarization multiplexer/demultiplexer circuit 23, a second polarization multiplexer/demultiplexer circuit 24, an antenna unit 25, and a receiver 26.

The first transmitter 21 generates the first signal light 41 whose polarization state is orthogonal to the polarization state of the first reception light component of the third signal light 43 to be irradiated from the second transmission/reception device 30, and outputs the first signal light 41 to the first polarization multiplexer/demultiplexer circuit 23.

The second transmitter 22 generates the second signal light 42 whose polarization state is orthogonal to the polarization state of the second reception light component of the third signal light 43 to be irradiated from the second transmission/reception device 30, and outputs the second signal light 42 to the second polarization multiplexer/demultiplexer circuit 24.

The first polarization multiplexer/demultiplexer circuit 23 separates the third signal light 43 input from the antenna unit 25, and the first signal light 41 input from the first transmitter 21 from each other depending on a polarization state, and outputs the first signal light 41 and the first reception light component of the third signal light 43 in directions different from each other on one axis. In the exemplary embodiment, the first signal light 41 is output to the antenna unit 25, and the first reception light component of the third signal light 43 is output to the receiver 26.

The second polarization multiplexer/demultiplexer circuit 24 separates the third signal light 43 input from the antenna unit 25, and the second signal light 42 input from the second transmitter 22 from each other depending on a polarization state, and outputs the second signal light 42 and the second reception light component of the third signal light 43 in directions different from each other on one axis. In the exemplary embodiment, the second signal light 42 is output to the antenna unit 25, and the second reception light component of the third signal light 43 is output to the receiver 26.

The third signal light 43 radiated from the second transmission/reception device 30 is irradiated to the antenna unit 25. The antenna unit 25 outputs the irradiated third signal light 43 to the first polarization multiplexer/demultiplexer circuit 23 and to the second polarization multiplexer/demultiplexer circuit 24. Further, the antenna unit 25 radiates the first signal light 41 input from the first polarization multiplexer/demultiplexer circuit 23, and the second signal light 42 input from the second polarization multiplexer/demultiplexer circuit 24 toward the second transmission/reception device 30.

The receiver 26 combines the first reception light component of the third signal light 43 input from the first polarization multiplexer/demultiplexer circuit 23, and the second reception light component of the third signal light 43 input from the second polarization multiplexer/demultiplexer circuit 24 for processing. In the exemplary embodiment, the receiver 26 processes the third signal light 43 as combined light of the first reception light component and the second reception light component by applying a digital coherent technique.

On the other hand, the second transmission/reception device 30 radiates the third signal light 43 alternately including the first reception light component and the second reception light component whose polarization states are orthogonal to each other in a time-wise manner toward the first transmission/reception device 20. Further, the second transmission/reception device 30 is irradiated with the first signal light 41 and the second signal light 42 whose polarization states are orthogonal to each other from the first transmission/reception device 20. As described above, the polarization state of the first signal light 41 and the polarization state of the first reception light component of the third signal light 43 are orthogonal to each other, and the polarization state of the second signal light 42 and the polarization state of the second reception light component of the third signal light 43 are orthogonal to each other.

As illustrated in FIG. 1, the second transmission/reception device 30 is provided with a transmitter 31, a modulator 32, a polarization demultiplexer circuit 33, a polarization multiplexer/demultiplexer circuit 34, a first multiplexer/demultiplexer circuit 35, a second multiplexer/demultiplexer circuit 36, an antenna unit 37, and a receiver 38.

The transmitter 31 generates signal light as a source of the third signal light 43, and outputs the signal light to the modulator 32.

The modulator 32 modulates the signal light input from the transmitter 31 into the third signal light 43, and outputs the third signal light 43 to the polarization demultiplexer circuit 33. The third signal light 43 alternately includes a first transmission light component whose polarization state is orthogonal to the polarization state of the first signal light 41 irradiated from the first transmission/reception device 20, and a second transmission light component whose polarization state is orthogonal to the polarization state of the second signal light 42 to be irradiated from the first transmission/reception device 20 in a time-wise manner.

The polarization demultiplexer circuit 33 separates the third signal light 43 input from the modulator 32 depending on a polarization state, outputs the first transmission light component of the third signal light 43 to the first multiplexer/demultiplexer circuit 35, and outputs the second transmission light component of the third signal light 43 to the second multiplexer/demultiplexer circuit 36.

The polarization multiplexer/demultiplexer circuit 34 separates the first signal light 41 and the second signal light 42 input from the antenna unit 37 depending on a polarization state, outputs the first signal light 41 to the first multiplexer/demultiplexer circuit 35, and outputs the second signal light 42 to the second multiplexer/demultiplexer circuit 36. Further, the polarization multiplexer/demultiplexer circuit 34 combines the first transmission light component of the third signal light 43 input from the first multiplexer/demultiplexer circuit 35, and the second transmission light component of the third signal light 43 input from the second multiplexer/demultiplexer circuit 36, and outputs the third signal light 43 to the antenna unit 37.

The first multiplexer/demultiplexer circuit 35 outputs the first signal light 41 input from the polarization multiplexer/demultiplexer circuit 34, and the first transmission light component of the third signal light 43 input from the polarization demultiplexer circuit 33 in directions different from each other on one axis. In the exemplary embodiment, the first signal light 41 is output to the receiver 38, and the first transmission light component of the third signal light 43 is output to the polarization multiplexer/demultiplexer circuit 34.

The second multiplexer/demultiplexer circuit 36 outputs the second signal light 42 input from the polarization multiplexer/demultiplexer circuit 34, and the second transmission light component of the third signal light 43 input from the polarization demultiplexer circuit 33 in directions different from each other on one axis. In the exemplary embodiment, the second signal light 42 is output to the receiver 38, and the second transmission light component of the third signal light 43 is output to the polarization multiplexer/demultiplexer circuit 34.

The first signal light 41 and the second signal light 42 radiated from the first transmission/reception device 20 are irradiated to the antenna unit 37. The antenna unit 37 outputs the irradiated first signal light 41 and the irradiated second signal light 42 to the polarization multiplexer/demultiplexer circuit 34. Further, the antenna unit 37 radiates the third signal light 43 input from the polarization multiplexer/demultiplexer circuit 34 toward the first transmission/reception device 20.

The receiver 38 combines the first signal light 41 input from the first multiplexer/demultiplexer circuit 35, and the second signal light 42 input from the second multiplexer/demultiplexer circuit 36 for processing. In the exemplary embodiment, the receiver 38 processes the combined light of the first signal light 41 and the second signal light 42 by applying a digital coherent technique.

The optical space transmission system 10 having the aforementioned configuration multiplexes and demultiplexes, on one axis, transmission light and reception light in a state that each of the transmission light and the reception light is separated into two components whose polarization states are orthogonal to each other in the first transmission/reception device 20 and in the second transmission/reception device 30. Thus, the optical space transmission system 10 according to the exemplary embodiment is capable of separating transmission light and reception light from each other with high precision for transmission/reception signal light, even when a digital coherent communication scheme is applied.

(Second Exemplary Embodiment)

Figure 2:
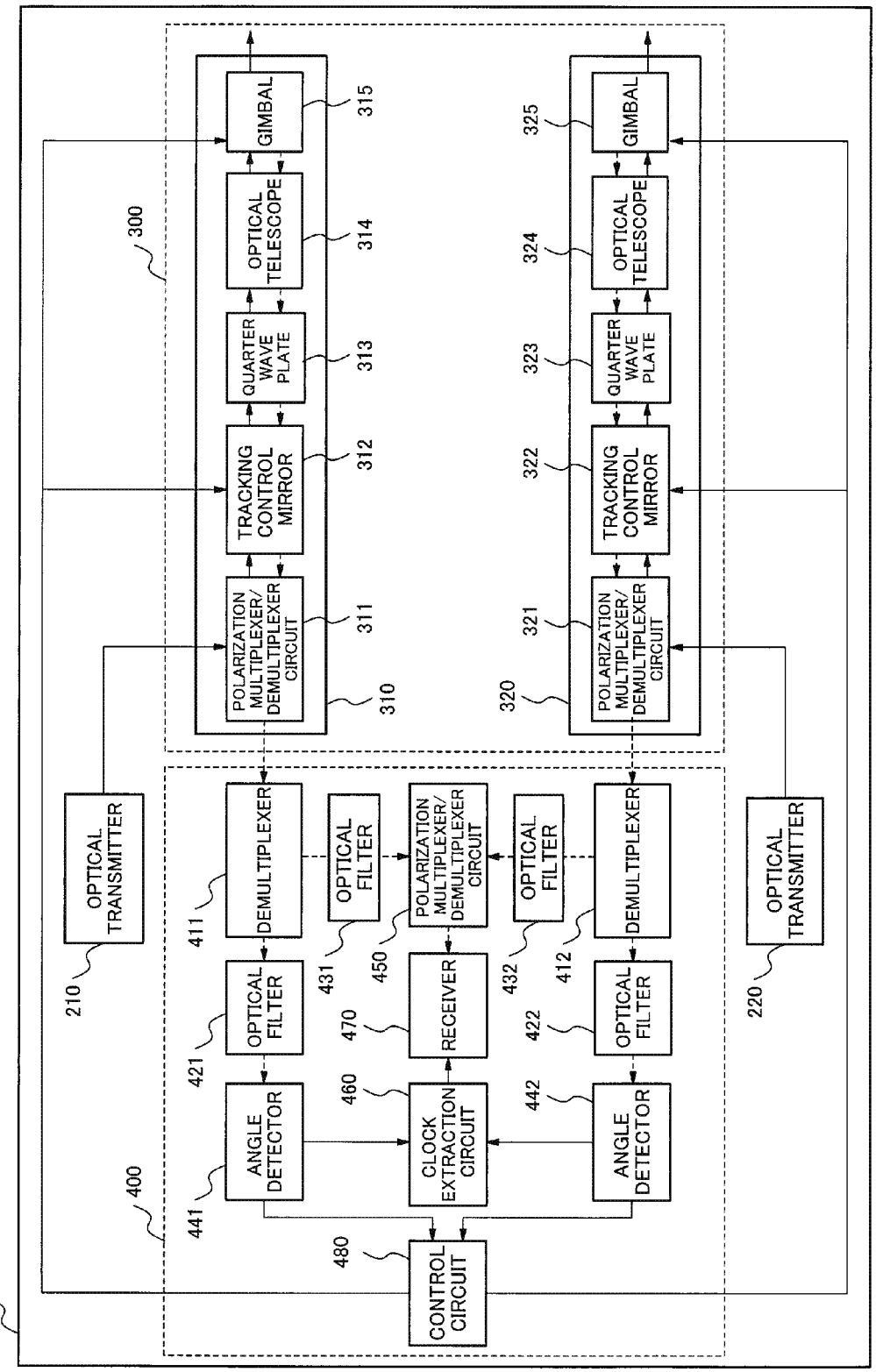
FIG. 2 is a block configuration diagram of a transmission/reception device 100 according to a second exemplary embodiment.

A second exemplary embodiment is described. A transmission/reception device according to the exemplary embodiment is mainly used for a terminal station configured to transmit a large amount of information, such as a ground observation satellite or an airplane which holds image data relating to e.g. ground observation. FIG. 2 is a configuration diagram of the transmission/reception device according to the exemplary embodiment. In FIG. 2, a transmission/reception device 100 is provided with two optical transmitters 210 and 220, an optical antenna unit 300, and an optical receiving unit 400.

The optical transmitters 210 and 220 respectively generate linearly polarized modulated signals, each of which has polarization states orthogonal to each other, and output the modulated signals to polarization multiplexer/demultiplexer circuits 311 and 321 of the optical antenna unit 300.

The optical antenna unit 300 radiates transmission light into the free space, and tracks signal light to be output from a partner station for securing an optical link path. In the exemplary embodiment, the optical antenna unit 300 is provided with two input/output ports 310 and 320. The input/output port 310 is provided with a polarization multiplexer/demultiplexer circuit 311, a tracking control mirror 312, a quarter wave plate 313, an optical telescope 314, and a gimbal 315; and the input/output port 320 is provided with a polarization multiplexer/demultiplexer circuit 321, a tracking control mirror 322, a quarter wave plate 323, an optical telescope 324, and a gimbal 325.

Each of the polarization multiplexer/demultiplexer circuits 311 and 321 separates input signal light into transmission light and reception light based on a polarization state. The polarization multiplexer/demultiplexer circuit 311 guides the transmission light toward the tracking control mirror 312, and guides the reception light toward a demultiplexer 411 of the optical receiving unit 400; and the polarization multiplexer/demultiplexer circuit 321 guides the transmission light toward the tracking control mirror 322, and guides the reception light toward a demultiplexer 421 of the optical receiving unit 400.

Each of the tracking control mirrors 312 and 322 controls the optical axis direction of transmission light and the optical axis direction of reception light. Each of the quarter wave plates 313 and 323 converts a linearly polarized light beam into circularly polarized light, and converts circularly polarized light into linearly polarized light. Each of the optical telescopes 314 and 324 secures a gain of an antenna at the time of transmission/reception. Each of the gimbals 315 and 325 controls the radiating and receiving directions of a transmitted beam and of a received beam. Transmission light whose polarization states are orthogonal to each other is radiated from each of the input/output ports 310 and 320 having the aforementioned configuration.

The optical receiving unit 400 has a function of receiving signal light output from the partner station, and a function of tracking signal light output from the partner station. As illustrated in FIG. 2, the optical receiving unit 400 is provided with the two demultiplexers 411 and 412, four optical filters 421, 422, 431, and 432, two angle detectors 441 and 442, a polarization multiplexer/demultiplexer circuit 450, a clock extraction circuit 460, a receiver 470, and a control circuit 480.

The demultiplexer 411 splits reception light input from the input/output port 310 of the optical antenna unit 300 into two light components, and outputs the two light components to the optical filter 421 and to the optical filter 431; and the demultiplexer 412 splits reception light input from the input/output port 320 of the optical antenna unit 300 into two light components, and outputs the two light components to the optical filter 422 and to the optical filter 432.

Each of the optical filters 421, 422, 431, and 432 separates reception light and a leak light component of transmission light from each other based on a wavelength, and outputs the reception light after removal of the leak light component of transmission light. The reception light separated by the optical filters 421 and 422 is input to the angle detectors 441 and 442. The reception light separated by the optical filters 431 and 432 is input to the polarization multiplexer/demultiplexer circuit 450.

The angle detectors 441 and 442 respectively detect incident angles of reception light input from the optical filters 421 and 422, generate signals for tracking, and output the signals to the clock extraction circuit 460 and to the control circuit 480.

The polarization multiplexer/demultiplexer circuit 450 combines the two reception light input from the optical filters 431 and 432 while maintaining the polarization states thereof, and outputs the combined light to the receiver 470.

The clock extraction circuit 460 detects a clock frequency component of the reception light from the signals input from the angle detectors 441 and 442, and outputs the detected clock frequency component to the receiver 470.

The receiver 470 demodulates a polarization-multiplexed signal input from the polarization multiplexer/demultiplexer circuit 450, based on the clock frequency component input from the clock extraction circuit 460. Thus, the receiver 470 obtains various information output from the partner station.

The control circuit 480 controls the orientations of the tracking control mirrors 312 and 322 and the orientations of the gimbals 315 and 325 of the optical antenna unit 300, based on the signals input from the angle detectors 441 and 442.

The transmission/reception device 100 having the aforementioned configuration is operated as follows. First of all, when information is transmitted from the transmission/reception device 100 to the partner station, each of the optical transmitters 210 and 220 generates transmission light, and the optical transmitters 210 and 220 respectively output the generated transmission light to the polarization multiplexer/demultiplexer circuits 311 and 321 of the optical antenna unit 300. The polarization multiplexer/demultiplexer circuits 311 and 321 set the transmission light input from the optical transmitters 210 and 220 in such a manner that the polarization states of the transmission light are orthogonal to each other. The transmission light, whose polarization states are controlled as described above, is converted into circularly polarized light whose rotating directions are opposite to each other by the quarter wave plates 313 and 323.

Thus, transmission light in a single polarization state is released into the free space from one of the input/output ports i.e. from the input/output port 310, and transmission light in a single polarization state, whose polarization state is orthogonal to the polarization state of the former transmission light is released into the free space from the other one of the input/output ports i.e. from the input/output port 320. The two transmission light released into the free space spreads to the diffraction limit of light. Therefore, on the partner station, the two transmission light overlaps each other, and the overlapping portion can be regarded as one transmission light such that two transmission light is polarization-multiplexed.

Subsequently, when the transmission/reception device 100 receives reception light output from the partner station, the reception light output from the partner station is irradiated to the optical antenna unit 300. The optical antenna unit 300 is irradiated with, as the reception light, circularly polarized signal light such that the polarization direction is alternately rotated in directions opposite to each other at a time interval i.e. at an arbitrary clock frequency.

Reception light irradiated to the input/output port 310 is converted from circularly polarized light, which is alternately rotated in directions opposite to each other by the quarter wave plate 313, into signal light such that two linearly polarized lights whose polarization directions are orthogonal to each other are alternately changed. Regarding the converted signal light, only one of the polarization components is extracted by the polarization multiplexer/demultiplexer circuit 311, and is output to the demultiplexer 411 of the optical receiving unit 400.

On the other hand, reception light irradiated to the input/output port 320 is converted from circularly polarized light, which is alternately rotated in directions opposite to each other by the quarter wave plate 323, into signal light such that two linearly polarized lights whose polarization directions are orthogonal to each other are alternately changed. Regarding the converted signal light, only the other one of the polarization components is extracted by the polarization multiplexer/demultiplexer circuit 321, and is output to the demultiplexer 421 of the optical receiving unit 400.

Specifically, reception light output from the polarization multiplexer/demultiplexer circuit 311, and reception light output from the polarization multiplexer/demultiplexer circuit 321 turn into signal light, whose polarization states are orthogonal to each other shifted at a time interval corresponding to a clock frequency. This is because the polarization states of reception light irradiated from the partner station are alternately changed at a time interval corresponding to a clock frequency.

Further, the polarization direction of reception light to be separated by the polarization multiplexer/demultiplexer circuit 311 is orthogonal to the polarization direction of transmission light to be combined by the polarization multiplexer/demultiplexer circuit 311. Likewise, the polarization direction of reception light to be separated by the polarization multiplexer/demultiplexer circuit 321 is orthogonal to the polarization direction of transmission light to be combined by the polarization multiplexer/demultiplexer circuit 321. Therefore, transmission light is not guided from the polarization multiplexer/demultiplexer circuits 311 and 321 toward the demultiplexers 411 and 421, and only reception light is transmitted through the demultiplexers 411 and 421.

Output light input from the input/output ports 310 and 320 to the demultiplexers 411 and 421 is respectively split by the demultiplexers 411 and 412, and is output to the optical filters 421, 422, 431, and 432.

Regarding the output light input to the optical filters 421 and 422, the leak light component of transmission light is removed based on a wavelength, and only the reception light is input to the angle detectors 441 and 442. On the other hand, regarding the output light input to the optical filters 431 and 432, the leak light component of transmission light is removed based on a wavelength, and only the reception light is input to the polarization multiplexer/demultiplexer circuit 450.

The angle detectors 441 and 442 acquire angle information of the optical axis of input reception light, generate control signals for tracking, and output the generated control signals to the clock extraction circuit 460 and to the control circuit 480. Further, the polarization multiplexer/demultiplexer circuit 450 combines the input two reception light, and outputs the combined light to the receiver 470.

The receiver 470 demodulates the reception light input from the polarization multiplexer/demultiplexer circuit 450 with use of the clock frequency component input from the clock extraction circuit 460. Thus, the receiver 470 acquires various information output from the partner station. In the exemplary embodiment, the receiver 470 processes reception light input from the polarization multiplexer/demultiplexer circuit 450 by applying a digital coherent technique.

The control circuit 480 controls the tracking control mirrors 312 and 322 and the gimbals 315 and 325 of the optical antenna unit 300, based on the angle information input from the angle detectors 441 and 442.

On the other hand, the clock extraction circuit 460 extracts the clock frequency component from the reception light input from the angle detectors 441 and 442, and outputs the extracted clock frequency component to the receiver 470. This is because the envelope waveforms of reception light to be input to the angle detectors 441 and 442 are intensity-modulated by a clock component.

As described above, the transmission/reception device 100 according to the exemplary embodiment is provided with the two input/output ports 310 and 320, which individually process signal light whose polarization states are orthogonal to each other. This makes it possible to separate reception light and transmission light from each other based on a polarization state with high precision in the polarization multiplexer/demultiplexer circuits 311 and 321 of the input/output ports 310 and 320.

Further, in the transmission/reception device 100 according to the exemplary embodiment, after a leak light component of transmission light is separated and removed by polarization in the polarization multiplexer/demultiplexer circuits 311 and 321, the leak light component is separated and removed by a wavelength by the optical filters 431 and 432. Thus, only weak reception light that does not include noise light of transmission light is extracted, and is input to the receiver 470.

In this way, the transmission/reception device 100 according to the exemplary embodiment makes it possible to separate transmission light and reception light from each other with high precision for transmission/reception signal light even when a digital coherent communication scheme is applied. In the exemplary embodiment, circularly polarized transmission light is radiated from the input/output ports 310 and 320. The invention, however, is not limited to the above. For instance, it is possible to radiate linearly polarized light, without modulating into circularly polarized light, and it is possible to modulate into elliptically polarized light, and radiate the elliptically polarized light.

(Third Exemplary Embodiment)

Figure 3A:
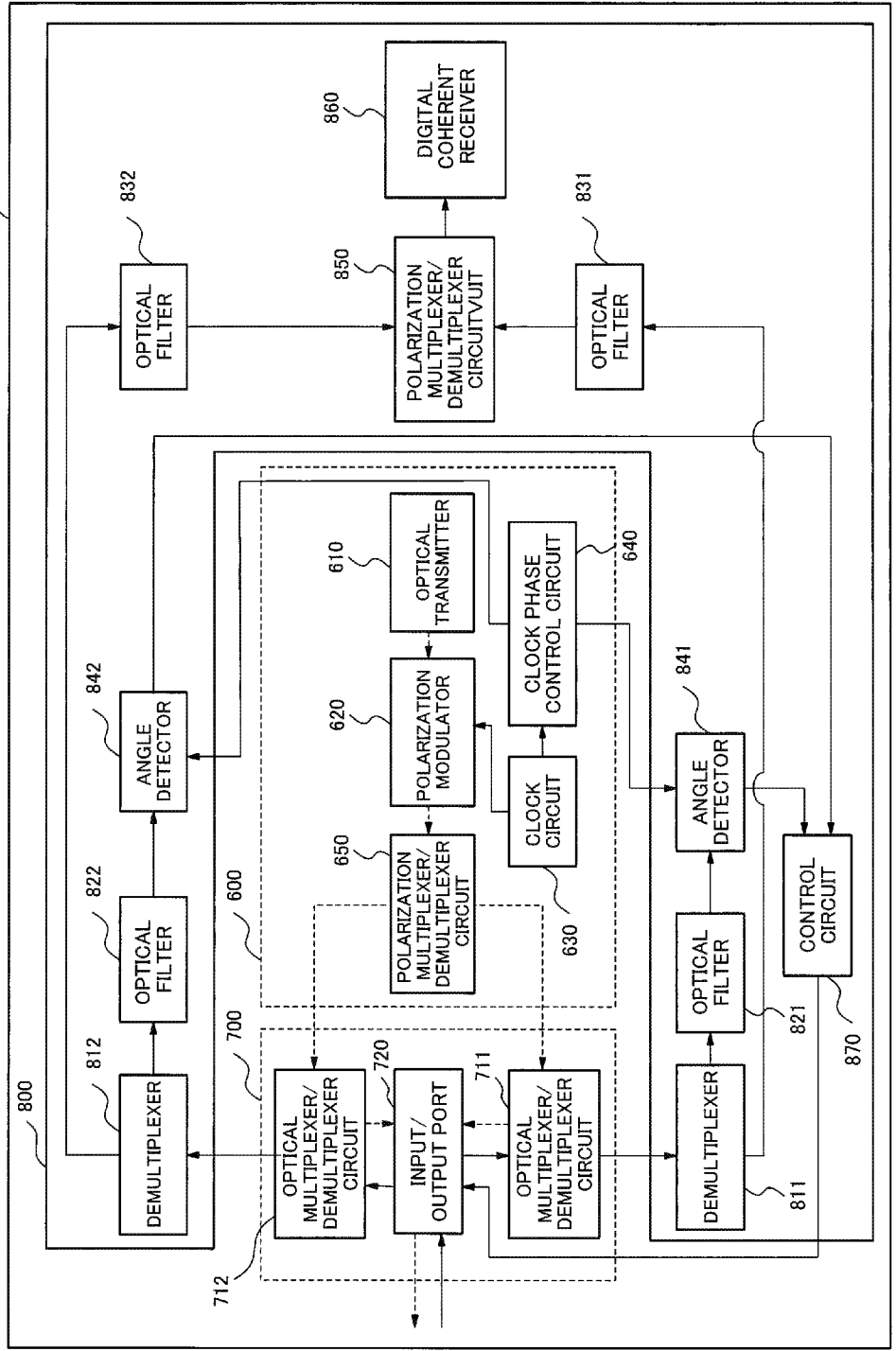
FIG. 3A is a block configuration diagram of a transmission/reception device 500 according to a third exemplary embodiment.

A third exemplary embodiment is described. A transmission/reception device according to the exemplary embodiment is mainly used for a transmission/reception device configured to receive a large amount of information from a partner station, such as a ground station or a data relay satellite. FIG. 3A is a configuration diagram of the transmission/reception device according to the exemplary embodiment. In FIG. 3A, a transmission/reception device 500 is provided with an optical transmitting unit 600, an optical antenna unit 700, and an optical receiving unit 800.

The optical transmitting unit 600 generates transmission light such as a control signal to be transmitted to the partner station, polarization-modulates the generated transmission light at an arbitrary clock frequency, and outputs transmission light whose polarization states are alternately orthogonal to each other in a time-wise manner. The optical transmitting unit 600 according to the exemplary embodiment is provided with an optical transmitter 610, a polarization modulator 620, a clock circuit 630, a clock phase control circuit 640, and a polarization multiplexer/demultiplexer circuit 650.

The optical transmitter 610 converts transmission information such as a control signal to be transmitted to the partner station into an optical signal, and outputs the optical signal to the polarization modulator 620. The polarization modulator 620 modulates the optical signal input from the optical transmitter 610 into an optical signal such that the polarization states thereof orthogonal to each other are alternately repeated in a time-wise manner, based on a clock signal input from the clock circuit 630, and outputs the optical signal to the polarization multiplexer/demultiplexer circuit 650.

The clock circuit 630 generates a clock signal to be modulated at an arbitrary clock frequency, and outputs the clock signal to the polarization modulator 620 and to the clock phase control circuit 640. The clock phase control circuit 640 controls the phase of the clock circuit 630, and controls angle detectors 841 and 842 of the optical receiving unit 800 based on the clock signal input from the clock circuit 630.

The polarization multiplexer/demultiplexer circuit 650 separates the optical signal which is input from the polarization modulator 620 and is alternately modulated in a time-wise manner depending on a polarization state, and respectively outputs the separated optical signals to optical multiplexer/demultiplexer circuits 711 and 712 of the optical antenna unit 700.

The optical antenna unit 700 radiates an optical signal input from the optical transmitting unit 600 into the free space as transmission light, and tracks signal light irradiated from the partner station for securing an optical link path. The optical antenna unit 700 according to the exemplary embodiment is provided with the optical multiplexer/demultiplexer circuits 711 and 712, and an input/output port 720.

The optical multiplexer/demultiplexer circuits 711 and 712 multiplex and demultiplex a beam of a transmission light and a beam of a reception light from the partner station on one axis. For instance, an optical circulator, an optical coupler, or a semi-transparent reflection mirror may be used as the optical multiplexer/demultiplexer circuits 711 and 712.

Figure 3B:
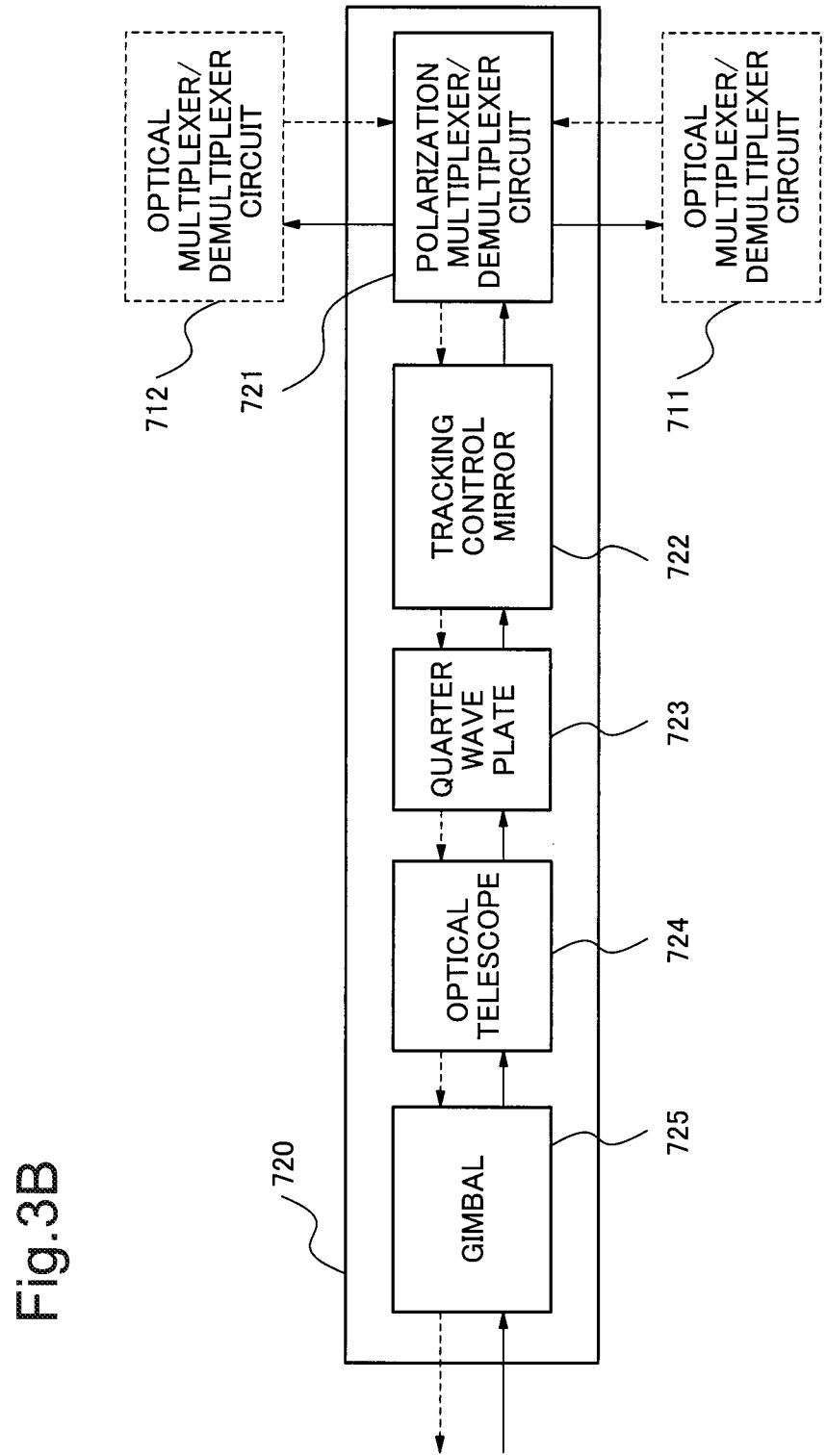
FIG. 3B is a block configuration diagram of an input/output port 720 according to the third exemplary embodiment.

FIG. 3B is a block configuration diagram of the input/output port 720. In FIG. 3B, the input/output port 720 is provided with a polarization multiplexer/demultiplexer circuit 721, a tracking control mirror 722, a quarter wave plate 723, an optical telescope 724, and a gimbal 725.

The polarization multiplexer/demultiplexer circuit 721 separates an input signal into transmission light and reception light from each other, based on a polarization state. The separated transmission light is guided toward the tracking control mirror 722, and the separated reception light is guided toward the optical multiplexer/demultiplexer circuit 711 or toward the optical multiplexer/demultiplexer circuit 712 depending on a polarization state.

The tracking control mirror 722 controls the optical axis direction of transmission light and the optical axis direction of reception light. The quarter wave plate 723 converts a linearly polarized light beam into circularly polarized light, and converts circularly polarized light into linearly polarized light. The optical telescope 724 secures an antenna gain at the time of transmission/reception. The gimbal 725 controls the radiation direction of a transmitted beam and of a received beam.

The optical receiving unit 800 has a function of processing signal light irradiated from the partner station, and a function of tracking signal light irradiated from the partner station. The optical receiving unit 800 according to the exemplary embodiment is provided with two demultiplexers 811 and 812, four optical filters 821, 822, 831, and 832, the two angle detectors 841 and 842, a polarization multiplexer/demultiplexer circuit 850, a digital coherent receiver 860, and a control circuit 870.

The demultiplexer 811 splits reception light output from the optical multiplexer/demultiplexer circuit 711 of the optical antenna unit 700 into two light components, and outputs the two light components to the optical filters 821 and 831; and the demultiplexer 812 splits reception light output from the optical multiplexer/demultiplexer circuit 712 of the optical antenna unit 700 into two light components, and outputs the two light components to the optical filters 822 and 832.

Each of the optical filters 821, 822, 831, and 832 separates reception light and a leak light component of transmission light from each other based on a wavelength, and outputs the reception light after removal of the leak light component of transmission light. The reception light after removal of the leak light component of transmission light by the optical filters 821 and 822 is output to the angle detectors 841 and 842. The reception light after removal of the leak light component of transmission light by the optical filters 831 and 832 is output to the polarization multiplexer/demultiplexer circuit 850.

The angle detectors 841 and 842 respectively detect incident angles of input reception light, based on a control signal input from the clock phase control circuit 640, generate signals (angle information of the optical axis) for tracking the partner station, and output the signals to the control circuit 870. The function of the angle detectors 841 and 842 will be described later.

The polarization multiplexer/demultiplexer circuit 850 combines the two reception lights, each of which is split by the demultiplexers 811 or 812, while maintaining the polarization states thereof, and outputs the combined light to the digital coherent receiver 860. Specifically, the polarization multiplexer/demultiplexer circuit 850 outputs a polarization-multiplexed signal such that two polarization components thereof having polarization states orthogonal to each other are combined while maintaining the polarization states orthogonal to each other.

The digital coherent receiver 860 demodulates the polarization-multiplexed signal input from the polarization multiplexer/demultiplexer circuit 850. Thus, the digital coherent receiver 860 receives signal light output from the partner station in a digital coherent manner.

The control circuit 870 controls the tracking control mirror 722 and the gimbal 725 of the optical antenna unit 700, based on angle information of the optical axis output from the angle detectors 841 and 842.

The transmission/reception device 500 having the aforementioned configuration is operated as follows. First of all, when transmission information such as a control signal is transmitted from the transmission/reception device 500 to the partner station, the transmission information to be transmitted to the partner station is converted into an optical signal by the optical transmitter 610. The converted transmission light is modulated into transmission light which has two polarization states of being alternately orthogonal to each other in a time-wise manner by the polarization modulator 620, based on a clock frequency input from the clock circuit 630, and the modulated transmission light is output to the polarization multiplexer/demultiplexer circuit 650. The clock frequency to be generated by the clock circuit 630 is sufficiently small, as compared with a data frequency of transmission light. The transmission light is modulated in a frequency range of from several Hz to several MHz.

The polarization-modulated transmission light output from the polarization modulator 620 is separated into two of single polarized transmission lights each having only a single polarization component by the polarization multiplexer/demultiplexer circuit 650. The two of the transmission lights are respectively output to the optical multiplexer/demultiplexer circuits 711 and 712 of the optical antenna unit 700.

The two of the transmission lights each having only a single polarization component are respectively input from the polarization multiplexer/demultiplexer circuit 650 to the optical multiplexer/demultiplexer circuits 711 and 712 of the optical antenna unit 700, and reception light from the partner station is input from the optical input port 720. The optical multiplexer/demultiplexer circuits 711 and 712 set the input transmission light and the input reception light in such a manner that the propagating direction of transmission light and the propagating direction of reception light are opposite to each other, based on the polarization state of the input transmission light and the polarization state of the input reception light, guide the transmission light toward the optical input port 720, and guide the reception light toward the demultiplexers 811 and 821.

The two of the transmission lights guided toward the optical input/output port 720 are combined by the polarization multiplexer/demultiplexer circuit 721 in a state that the polarization states of the two transmission light are orthogonal to each other. The combined transmission light is converted into a signal including two of circularly polarized lights which are rotated in directions alternately opposite to each other in a time-wise manner by the quarter wave plate 723. The converted signal is released into the free space toward the partner station. Specifically, a polarization-multiplexed signal, in which two polarization components having polarization states orthogonal to each other are combined, is released from the optical input/output port 720 toward the partner station.

Subsequently, when the transmission/reception device 500 receives reception light output from the partner station, the reception light output from the partner station is input to the input/output port 720 of the optical antenna unit 700. In this configuration, signal light from the partner station is constituted of circularly polarized signal light which is rotated clockwise, and circularly polarized signal light which is rotated counterclockwise. Specifically, signal light from the partner station includes signal light having two polarization states.

Reception light input to the input/output port 720 is converted from two circularly polarized reception light which is rotated in directions opposite to each other into two linearly polarized reception light whose polarization directions are orthogonal to each other by the quarter wave plate 723. The converted reception light is separated into two single polarized reception light, while maintaining the polarization states thereof orthogonal to each other by the polarization multiplexer/demultiplexer circuit 721. The two reception light separated from each other depending on a polarization state is respectively guided toward the demultiplexers 811 and 812 of the optical receiving unit 800 by the optical multiplexer/demultiplexer circuits 711 and 712.

Reception light input to the optical receiving unit 800 is respectively split into two light components by the demultiplexers 811 and 812. One of the split light components of the reception light is output to the angle detectors 841 and 842 for use in generating a control signal for tracking. The other one of the split light components of the reception light is combined by the polarization multiplexer/demultiplexer circuit 850, and digital coherent processing is performed with respect to the combined light by the digital coherent receiver 860.

When digital coherent processing is performed with respect to reception light in the digital coherent receiver 860, it is possible to electrically remove a leak component of transmission light. Specifically, generally, in digital coherent receiving, after local light and signal light are mixed together for coherent receiving, the mixed light is converted into a digital signal by an analog-to-digital electrical circuit, and the digital signal is subjected to demodulation signal processing. In this configuration, the electrical signal after coherent receiving turns into a modulated signal having a wavelength of local light and a wavelength of signal light, in other words, a modulated signal having a carrier wave frequency band. As a difference in carrier wave frequency between local light and signal light increases, the degree of frequency modulation increases. Thus, it is possible to utilize a phenomenon such that the modulated frequency exceeds the receivable frequency band, and a signal of the modulated frequency is unreceivable (electrical filtering effect).

Applying the aforementioned electrical filtering effect utilizing a difference in wavelength between local light and a noise component by leakage of transmission light in the digital coherent receiver 860 makes it possible to remove the noise component by leakage of transmission light with high precision, and to implement stable receiving. As the electrical filtering effect, it is sufficient to set several nm to several ten nm as the wavelength interval between transmission light and reception light to be transmitted and received. However, it is desirable to set the wavelength interval to be 20 nm or more at which it is possible to separate transmission light and reception light from each other only with use of an optical filter.

Further, in the exemplary embodiment, the angle detectors 841 and 842 are gate controlled by the clock circuit phase control circuit 640 in such a manner as to remove an influence of noise component by leakage of transmission light. The noise component by leakage of transmission light is intensity-modulated at an arbitrary clock frequency. Therefore, gate controlling the angle detectors 841 and 842 at a timing at which the intensity modulation is minimized makes it possible to remove a noise component by leakage of transmission light. Thus, it is possible to extract only the reception light.

Gate controlling the angle detectors 841 and 842 is described using FIG. 4. The portion (a) of FIG. 4 illustrates a time waveform of a clock frequency generated by the clock circuit 630. The portion (b) of FIG. 4 illustrates a time waveform of transmission light which is polarization modulated by the polarization modulator 620 based on a clock frequency. As illustrated in (b), transmission light is polarization modulated into two polarization states orthogonal to each other, based on a clock frequency. Hereinafter, one of the two polarization states is called as a P-polarized wave, and the other one of the two polarization states is called as an S-polarized wave.

The portion (c) of FIG. 4 illustrates a time waveform of a P-polarized wave component of transmission light after polarization separation, which leaks from the optical antenna unit 700 toward the angle detector 841. The portion (d) of FIG. 4 illustrates a time waveform of reception light to be irradiated from the optical antenna unit 700 to the angle detector 841 via the demultiplexer 811. The portion (e) of FIG. 4 illustrates a time waveform of a gate pulse to be applied from the clock phase control circuit 640 to the angle detector 841. The portion (f) of FIG. 4 illustrates a time waveform of a control signal to be output from the angle detector 841 at the time of application of a gate pulse.

The P-polarized wave component of transmission light illustrated in (c), and the reception light illustrated in (d) are input to the angle detector 841 in a combined state. On the other hand, the gate pulse illustrated in (e) is applied to the angle detector 841. The phase of the P-polarized wave component of transmission light illustrated in (c), and the phase of the gate pulse illustrated in (e) are opposite to each other. Therefore, applying the gate pulse illustrated in (e) to the angle detector 841 makes it possible to turn the angle detector 841 to an off-state at a timing at which the P-polarized wave component of transmission light is input. This allows for the angle detector 841 to output only the reception light illustrated in (f), in which transmission light is removed.

Likewise, the portion (g) of FIG. 4 illustrates a time waveform of an S-polarized wave component of transmission light after polarization separation, which leaks from the optical antenna unit 700 toward the angle detector 842. The portion (h) of FIG. 4 illustrates a time waveform of reception light to be irradiated from the optical antenna unit 700 to the angle detector 842 via the demultiplexer 812. The portion (i) of FIG. 4 illustrates a time waveform of a gate pulse to be applied from the clock phase control circuit 640 to the angle detector 842. The portion (j) of FIG. 4 illustrates a time waveform of a control signal to be output from the angle detector 842 at the time of application of a gate pulse.

The S-polarized wave component of transmission light illustrated in (g), and the reception light illustrated in (h) are input to the angle detector 842 in a combined state. On the other hand, the gate pulse illustrated in (i) is applied to the angle detector 842. The phase of the S-polarized wave component of transmission light illustrated in (g), and the phase of the gate pulse illustrated in (i) are opposite to each other. Therefore, applying the gate pulse illustrated in (i) to the angle detector 842 makes it possible to turn the angle detector 842 to an off-state at a timing at which the S-polarized wave component of transmission light is input. This allows for the angle detector 842 to output only the reception light illustrated in (j), in which transmission light is removed.

The control circuit 870 controls the tracking control mirror 722 and the gimbal 725 of the optical antenna unit 700 by concurrently using the reception light input from the angle detectors 841 and 842. Specifically, the control circuit 870 detects a clock frequency component from reception lights those are sequentially output from the angle detectors 841 and 842, and uses the clock frequency component as a tracking signal for establishing an optical link path between the partner station and the own station.

As described above, the transmission/reception device 500 according to the exemplary embodiment is capable of outputting, from the angle detectors 841 and 842, reception light such that leak light of transmission light is removed, with a time lag corresponding to a predetermined clock frequency, by applying a gate pulse whose phase is opposite to the phase of leak light of transmission light to the angle detectors 841 and 842.

Specifically, the transmission/reception device 500 according to the exemplary embodiment is provided with the two angle detectors 841 and 842, and the clock phase control circuit 640 which modulates a gate pulse to be applied to the angle detectors 841 and 842 at a predetermined clock frequency. The clock phase control circuit 640 generates a gate pulse that minimizes an influence by stray light of transmission light, and applies the gate pulse to the angle detectors 841 and 842. This makes it possible to eliminate a stray light component, which is a part of transmission light generated in the optical transmitting unit 600, and impinged in the same direction as reception light to be irradiated from the partner station due to the influence of scattering or reflection.

In other words, stray light of transmission light, which is polarization modulated at an arbitrary clock frequency, and is separated into two polarization components, is respectively received by the two angle detectors 841 and 842, which are alternately and repeatedly turned on and off. Thus, turning the angle detectors 841 and 842 off at a timing at which transmission light is irradiated makes it possible to remove a stray light component. On the other hand, constantly keeping one of the angle detectors in an on-state makes it possible to sequentially detect reception light. This makes it possible to establish an optical link path between the partner station and the own station.

In the aforementioned exemplary embodiment, circularly polarized transmission light is radiated from the input/output port 720. The invention, however, is not limited to the above. For instance, it is possible to radiate linearly polarized light, without modulating into circularly polarized light, and it is possible to modulate into elliptically polarized light and to radiate the elliptically polarized light.

(Fourth Exemplary Embodiment)

Figure 5A:
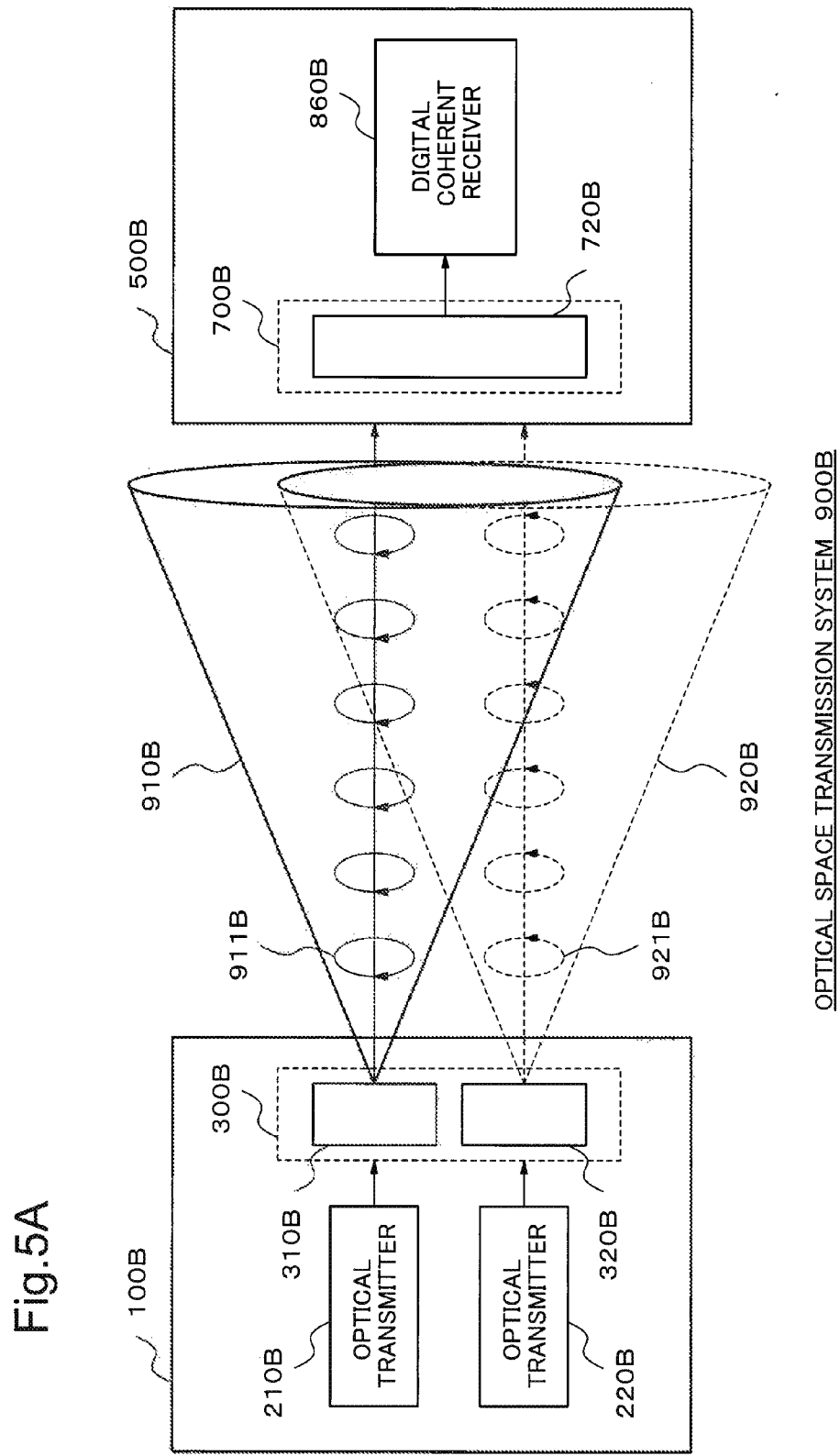
FIG. 5A is a system configuration diagram when information is transmitted from a first terminal station 100B to a second terminal station 500B in an optical space transmission system 900B according to a fourth exemplary embodiment.
Figure 5B:
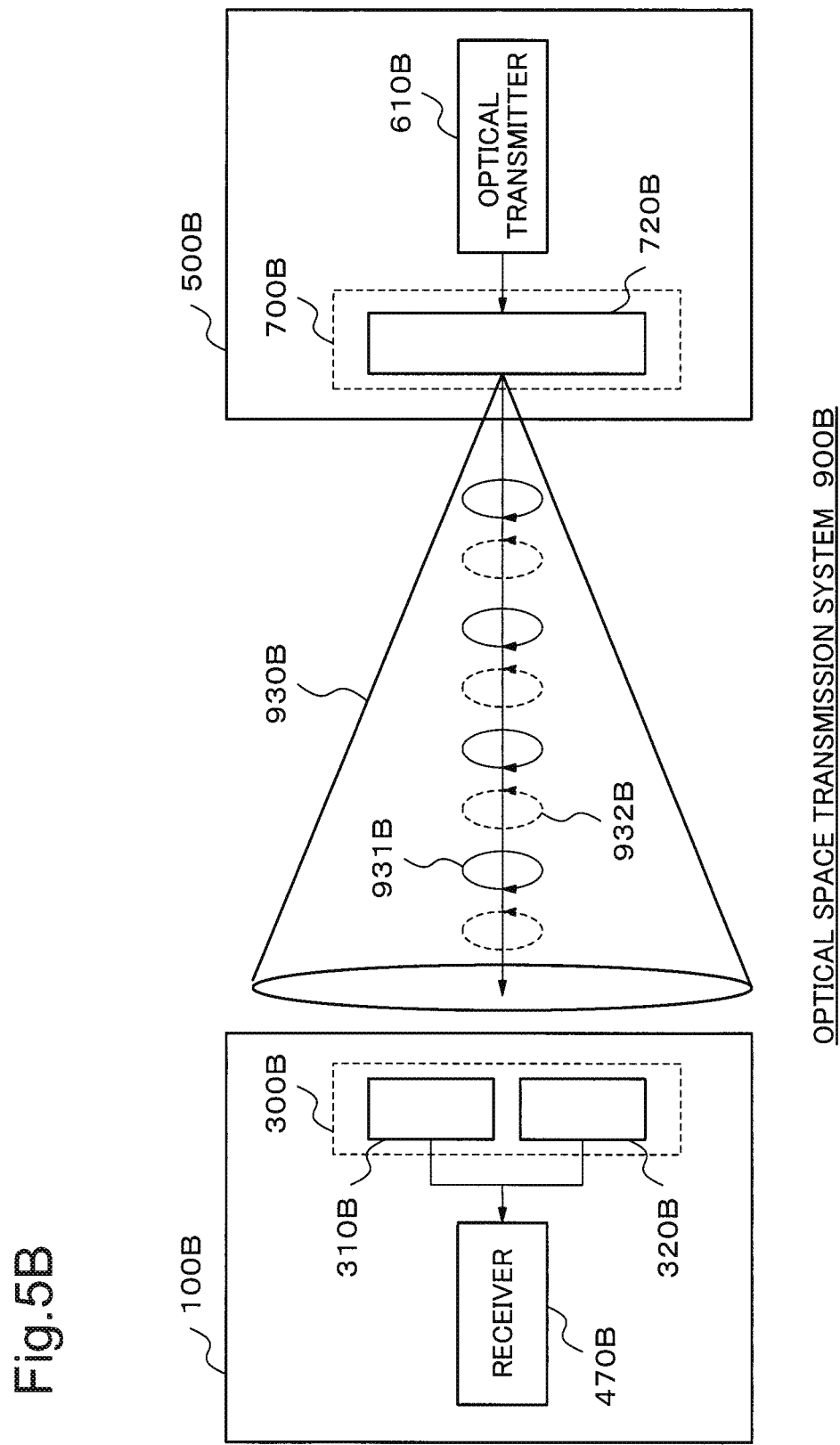
FIG. 5B is a system configuration diagram when information is transmitted from the second terminal station 500B to the first terminal station 100B in the optical space transmission system 900B according to the fourth exemplary embodiment.
Figure 6:
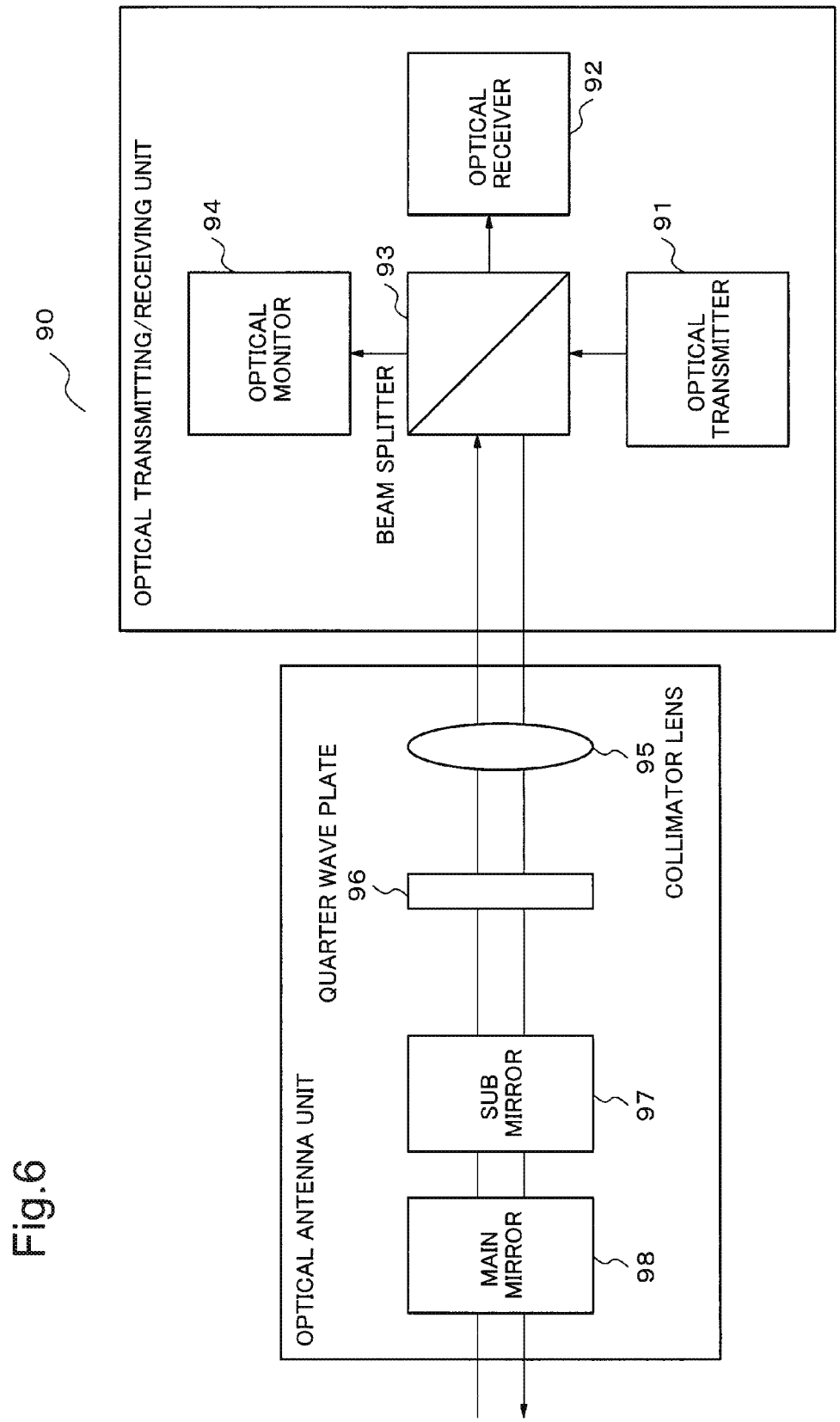
FIG. 6 is a block configuration diagram of an optical space communication device 90 of PTL 1.

A fourth exemplary embodiment is described. FIG. 5 and FIG. 5B are system configuration diagrams of an optical space communication system according to the exemplary embodiment. In FIG. 5A and FIG. 5B, an optical space communication system 900B is constituted of a first terminal station 100B and a second terminal station 500B.

FIG. 5A illustrates a state that transmission light beams 910B and 920B propagate into the free space when a large amount of information is transmitted from the first terminal station 100B to the second terminal station 500B. On the other hand, FIG. 5B illustrates a state that a transmission light beam 930B propagates into the free space when a relatively small amount of information such as a re-transmission control signal is transmitted from the second terminal station 500B to the first terminal station 100B.

The first terminal station 100B may be the transmission/reception device 100 described in the second exemplary embodiment referring to FIG. 2. For instance, the first terminal station 100B is a transmission/reception device which holds a large amount of information, such as a ground observation satellite or an airplane which holds image data relating to e.g. ground observation.

The second terminal station 500B may be the transmission/reception device 500 described in the third exemplary embodiment referring to FIG. 3A. For instance, the second terminal station 500B is a transmission/reception device which transmits and receives various information to and from the first terminal station 100B such as a ground station or a data relay satellite.

The first terminal station 100B is provided with two optical transmitters 210B and 220B, an optical antenna unit 300B, and a receiver 470B. In FIG. 5A, illustration of the receiver 470B is omitted, and in FIG. 5B, illustration of the two optical transmitters 210B and 220B is omitted.

The optical antenna unit 300B radiates the two transmission light beams 910B and 920B whose polarization states are different from each other, and whose rotating directions are opposite to each other. The optical antenna unit 300B is provided with two input/output ports 310B and 320B, which track the transmission light beam 930B irradiated from the second terminal station 500B for securing an optical link path.

The second terminal station 500B is provided with an optical transmitter 610B, an optical antenna unit 700B, and a digital coherent receiver 860B. In FIG. 5A, illustration of the optical transmitter 610B is omitted, and in FIG. 5B, illustration of the digital coherent receiver 860B is omitted.

The optical antenna unit 700B radiates the transmission light beam 930B into the free space. The optical antenna unit 700B is provided with an input/output port 720B, which tracks the transmission light beams 910B and 920B irradiated from the first terminal station 100B for securing an optical link path.

First of all, a case is described referring to FIG. 5A, in which information is transmitted from the first terminal station 100B to the second terminal station 500B. In this configuration, the first terminal station 100B radiates the transmission light beam 910B in a single polarization state from one of the optical antennas (from the input/output port 310B), and radiates, from the other one of the optical antennas (from the input/output port 320B), the transmission light beam 920B in a single polarization state such that the polarization state of the transmission light beam 920B is orthogonal to the polarization state of the transmission light beam 910B.

In the exemplary embodiment, transmission light to be transmitted from the first terminal station 100B is two of circularly polarized lights whose polarization states are such that the polarization directions are opposite to each other. Specifically, as illustrated in FIG. 5A, the transmission light beam 910B including clockwise-rotated circularly polarized transmission light 911B is released from the input/output port 310B of the first terminal station 100B, and the transmission light beam 920B including counterclockwise-rotated circularly polarized transmission light 921B is released from the input/output port 320B of the first terminal station 100B. The transmission light beams 910B and 920B have information different from each other.

The first terminal station 100B controls the transmission light beams 910B and 920B to overlap each other in the second terminal station 500B. The beam diameters of the transmission light beams 910B and 920B released from the first terminal station 100B in polarization states orthogonal to each other are expanded, as the transmission light beams 910B and 920B propagate into the space. The transmission light beams 910B and 920B overlap each other in the second terminal station 500B, while maintaining the polarization states orthogonal to each other. Specifically, the transmission light beams 910B and 920B are irradiated to the second terminal station 500B, as one signal light polarization-multiplexed in the circular polarization.

Causing the optical antenna 700B of the second terminal station 500B to receive a portion where the two transmission light beams 910B and 920B transmitted from the first terminal station 100B overlap each other makes it possible to obtain the same advantageous effects as if signal light that overlaps each other in the polarization directions is transmitted from the first terminal station 100B.

The second terminal station 500B receives single-polarized signals (transmission light beams 910B and 920B) transmitted from the first terminal station 100B in polarization states orthogonal to each other. The second terminal station 500B separates the received single-polarized signals orthogonal to each other from the transmission light beam 930B, based on a polarization state with use of an unillustrated polarization multiplexer/demultiplexer circuit. Further, the second terminal station 500B polarization-multiplexes again the two transmission light beams 910B and 920B from which the transmission light beam 930B is removed based on a polarization state. Thereafter, the second terminal station 500B performs digital coherent processing with respect to the transmission light beams 910B and 920B by the digital coherent receiver 860B.

Next, a case is described referring to FIG. 5B, in which information is transmitted from the second terminal station 500B to the first terminal station 100B. In this configuration, the second terminal station 500B releases the transmission light beam 930B, in which envelope signals whose polarization directions are orthogonal to each other are alternately modulated at a clock frequency. The second terminal station 500B modulates transmission light which holds data at a clock frequency, based on a reference clock signal by an unillustrated polarization modulator. Thus, the second terminal station 500B modulates the transmission light beam 930B at a clock frequency depending on a polarization direction.

Further, the second terminal station 500B separates the transmission light beam 930B which is polarization modulated at a clock frequency, into two of single polarized signal lights based on a polarization state with use of an unillustrated polarization multiplexer/demultiplexer circuit. The separated single polarized transmission lights are separated from the transmission light beams 910B and 920B irradiated from the first terminal station 100B, based on a polarization state. The separated single polarized transmission lights are guided toward the optical antenna 700B and combined again depending on a polarization direction for radiation.

Specifically, as illustrated in FIG. 5B, the transmission light beam 930B constituted of polarization-modulated circularly polarized light 931B (clockwise rotation) and polarization-modulated circularly polarized light 932B (counterclockwise rotation), which are rotated in directions opposite to each other in a time-wise manner, is released into the free space from the input/output port 720B of the second terminal station 500B. The transmission light beam 930B released from the second terminal station 500B reaches the first terminal station 100B while spreading by diffraction of light, and is irradiated to both of the input/output ports 310B and 320B provided in the first terminal station 100B. The transmission light beam 930B irradiated to the input/output ports 310B and the transmission light beam 930B irradiated to the input/output ports 320B are combined by the receiver 470B for processing.

The transmission light beam 930B irradiated from the second terminal station 500B to the first terminal station 100B is concurrently irradiated to the two input/output ports 310B and 320B of the optical antenna 300B, and is separated based on a polarization state by unillustrated polarization multiplexer/demultiplexer circuits of the input/output ports 310B and 320B. The two of the signal lights separated based on a polarization state are utilized for configuring an optical link by unillustrated angle detectors, and a clock component is extracted by utilizing the envelope waveforms of the separated optical signals.

In the optical space communication system 900B having the aforementioned configuration, it is possible to increase the transmission amount per single wavelength. This is because in optical transmission, utilizing the spread of a beam by propagation of transmission light whose polarization states are orthogonal to each other into the optical space makes it possible to multiplex the two of the transmission lights depending on a polarization direction.

Further, in the optical space communication system 900B having the aforementioned configuration, it is possible to effectively utilize an optical space communication system based on the premise of polarization-multiplexing the digital coherent transmitter/receiver 860B or the like. This is because it is possible to concurrently transmit/receive modulated signals whose polarization states are orthogonal to each other.

In the foregoing exemplary embodiments, to simplify the description, two transmitters or two receivers are individual circuits, and each of the transmitters and each of the receivers generate or receive an optical signal in one polarization state. The invention, however, is not limited to the above. For instance, in a digital coherent transmission/reception method, two transmitters have a function equivalent to the function of one transmitter which generates a polarization-multiplexed optical signal, and two receivers have a function equivalent to the function of one receiver which receives a polarization-multiplexed optical signal. The aforementioned exemplary embodiments are applicable to a variety of general communication methods including a polarization-multiplexed digital coherent transmission/reception method.

The invention of the present application is not limited by the aforementioned exemplary embodiments, and modifications of the design are included in the invention, as far as the modifications do not depart from the gist of the invention. Further, this application claims the priority based on Japanese Patent Application No. 2013-041833 filed on Mar. 4, 2013, and all of the disclosure of which is hereby incorporated.

INDUSTRIAL APPLICABILITY

The invention is widely applicable to an optical transmitter/receiver and to an optical communication system for transmission/reception a large amount of information.

REFERENCE SIGNS LIST

10 Optical space transmission system
20 First transmission/reception device
21 First transmitter
22 Second transmitter
23 First polarization multiplexer/demultiplexer circuit
24 Second polarization multiplexer/demultiplexer circuit
25 Antenna unit
26 Receiver
30 Second transmission/reception device
31 Transmitter
32 Modulator
33 Polarization demultiplexer circuit
34 Polarization multiplexer/demultiplexer circuit
35 First multiplexer/demultiplexer circuit
36 Second multiplexer/demultiplexer circuit
37 Antenna unit
38 Receiver
90 Optical space communication device
91 Optical transmitter
92 Optical receiver
93 Beam splitter
94 Optical monitor
95 Collimator lens
96 Quarter wave plate
97 Sub mirror
98 Main mirror
100 Transmission/reception device
210, 220 Optical transmitter
300 Optical antenna unit
310, 320 Input/output port
311, 321 Polarization multiplexer/demultiplexer circuit
312, 322 Tracking control mirror
313, 323 Quarter wave plate
314, 324 Optical telescope
315, 325 Gimbal
400 Optical receiving unit
411, 412 Demultiplexer
421, 422, 431, 432 Optical filter
441, 442 Angle detector
450 Polarization multiplexer/demultiplexer circuit
460 Clock extraction circuit
470 Receiver
480 Control circuit
500 Transmission/reception device
600 Optical transmitting unit
610 Optical transmitter
620 Polarization modulator
630 Clock circuit
640 Clock phase control circuit
650 Polarization multiplexer/demultiplexer circuit
700 Optical antenna unit
711, 712 Optical Multiplexer/demultiplexer circuit
720 Input/output port
721 Polarization multiplexer/demultiplexer circuit
722 Tracking control mirror
723 Quarter wave plate
724 Optical telescope
725 Gimbal
800 Optical receiving unit
811, 812 Demultiplexer
821, 822, 831, 832 Optical filter
841, 842 Angle detector
850 Polarization multiplexer/demultiplexer circuit
860 Digital coherent receiver
870 Control circuit
900B Optical space communication system

What is claimed is:

1. A transmission/reception device comprising:
an antenna unit which is irradiated with reception light alternately including a first reception light component and a second reception light component whose polarization states are orthogonal to each other in a timewise manner, and which radiates first transmission light having a polarization state orthogonal to the polarization state of the first reception light component, and second transmission light having a polarization state orthogonal to the polarization state of the second reception light component in a predetermined direction into an external space;
a first transmitter which generates the first transmission light;
a second transmitter which generates the second transmission light;
a first polarization multiplexer/demultiplexer circuit which separates the irradiated reception light and the generated first transmission light from each other depending on a polarization state, and outputs the first reception light component and the first transmission light in directions different from each other on one axis;
a second polarization multiplexer/demultiplexer circuit which separates the irradiated reception light and the generated second transmission light from each other depending on a polarization state, and outputs the second reception light component and the second transmission light in directions different from each other on one axis; and
a receiver which combines the output first reception light component and the output second reception light component for processing.

2. The transmission/reception device according to claim 1, further comprising:
a detector which detects an orientation of an optical axis of the reception light; and
a controller which controls an orientation of the antenna unit, based on the detected optical axis of the reception light.

3. The transmission/reception device according to claim 1, further comprising:
a first optical filter which is disposed between the first polarization multiplexer/demultiplexer circuit and the receiver, and configured to remove leak light of the first transmission light from the output of the first polarization multiplexer/demultiplexer circuit based on a wavelength; and a second optical filter which is disposed between the second polarization multiplexer/demultiplexer circuit and the receiver, and configured to remove leak light of the second transmission light from the output of the second polarization multiplexer/demultiplexer circuit based on a wavelength.

4. An optical space transmission system, comprising:
the first transmission/reception device according to claim 1 which is configured to radiate first signal light and second signal light whose polarization states are orthogonal to each other; and
a second transmission/reception device which is configured to radiate third signal light alternately including a first signal light component having a polarization state orthogonal to the polarization state of the first signal light, and a second signal light component having a polarization state orthogonal to the polarization state of the second signal light in a time-wise manner,
the second transmission/reception device comprising:
an antenna unit which radiates the third transmission light into an external space;
a transmitter which generates signal light;
a modulator which modulates the generated signal light into signal light alternately including a first transmission light component having a polarization state orthogonal to the polarization state of the first reception light, and a second transmission light component having a polarization state orthogonal to the polarization state of the second reception light in a time-wise manner;
a polarization demultiplexer circuit which separates the modulated signal light depending on a polarization state, and extracts the first transmission light component and the second transmission light component;
a first multiplexer/demultiplexer circuit which outputs the extracted first transmission light component and the first reception light in directions different from each other on one axis;
a second multiplexer/demultiplexer circuit which outputs the extracted second transmission light component and the second reception light in directions different from each other on one axis;
a polarization multiplexer/demultiplexer circuit which separates the first reception light and the second reception light from each other depending on a polarization state to output the first reception light and the second reception light to the first multiplexer/demultiplexer circuit and to the second multiplexer/demultiplexer circuit, respectively, and which combines the first transmission light component output from the first multiplexer/demultiplexer circuit and the second transmission light component output from the second multiplexer/demultiplexer circuit to output the combined light as the third transmission light to the antenna unit; and
a receiver which combines the first reception light output from the first multiplexer/demultiplexer circuit, and the second reception light output from the second multiplexer/demultiplexer circuit for processing.

5. The optical space transmission system according to claim 4, wherein
the first signal light, the second signal light, and the third signal light are each circularly polarized signal light or elliptically polarized signal light,
each of the first transmitter and the second transmitter of the first transmission/reception device, and of the transmitter of the second transmission/reception device generates linearly polarized signal light, and
each of the antenna unit of the first transmission/reception device, and of the antenna unit of the second transmission/reception device is provided with a quarter wave plate which converts linearly polarized light into circularly polarized light or into elliptically polarized light, or converts circularly polarized light or elliptically polarized light into linearly polarized light.

6. A transmission/reception device comprising:
an antenna unit which is irradiated with first reception light and second reception light whose polarization states are orthogonal to each other, and which radiates third transmission light into an external space;
a transmitter which generates signal light;
a modulator which modulates the generated signal light into signal light alternately including a first transmission light component having a polarization state orthogonal to the polarization state of the first reception light, and a second transmission light component having a polarization state orthogonal to the polarization state of the second reception light in a time-wise manner;
a polarization demultiplexer circuit which separates the modulated signal light depending on a polarization state, and extracts the first transmission light component and the second transmission light component;
a first multiplexer/demultiplexer circuit which outputs the extracted first transmission light component and the first reception light in directions different from each other on one axis;
a second multiplexer/demultiplexer circuit which outputs the extracted second transmission light component and the second reception light in directions different from each other on one axis;
a polarization multiplexer/demultiplexer circuit which separates the first reception light and the second reception light from each other depending on a polarization state to output the first reception light and the second reception light to the first multiplexer/demultiplexer circuit and to the second multiplexer/demultiplexer circuit, respectively, and which combines the first transmission light component output from the first multiplexer/demultiplexer circuit and the second transmission light component output from the second multiplexer/demultiplexer circuit to output the combined light as the third transmission light to the antenna unit; and
a receiver which combines the first reception light output from the first multiplexer/demultiplexer circuit, and the second reception light output from the second multiplexer/demultiplexer circuit for processing.

7. The transmission/reception device according to claim 6, wherein
the modulator modulates the transmission light based on a clock signal at a predetermined time interval, and
the transmission/reception device further includes:
a clock circuit which outputs the clock signal;
a first detector which is disposed between the first multiplexer/demultiplexer circuit and the receiver, and configured to extract an output, from a part of the output of the first multiplexer/demultiplexer circuit, for a period other than a period when a leak component of the first transmission light component is included, based on the clock signal for outputting to a controller;

a second detector which is disposed between the second multiplexer/demultiplexer circuit and the receiver, and configured to extract an output, from a part of the output of the second multiplexer/demultiplexer circuit, for a period other than a period when a leak component of the second transmission light component is included, based on the clock signal for outputting to the controller; and the controller which controls an orientation of the antenna unit, based on the output from the first detector and the output from the second detector.

8. The transmission/reception device according to claim 6, further comprising:

a first optical filter which is disposed between the first multiplexer/demultiplexer circuit and the receiver, and configured to remove a leak component of the first transmission light component from the output of the first multiplexer/demultiplexer circuit based on a wavelength; and a second optical filter which is disposed between the second multiplexer/demultiplexer circuit and the receiver, and configured to remove a leak component of the second transmission light component from the output of the second multiplexer/demultiplexer circuit based on a wavelength.

9. A transmission/reception method, comprising:

irradiating reception light alternately including a first reception light component and a second reception light component whose polarization states are orthogonal to each other in a time-wise manner;

generating first transmission light having a polarization state orthogonal to the polarization state of the first reception light component;

generating second transmission light having a polarization state orthogonal to the polarization state of the second reception light component;

separating the irradiated reception light and the generated first transmission light from each other based on a polarization state, and outputting the first reception light component and the first transmission light in directions different from each other on one axis;

separating the irradiated reception light and the generated second transmission light from each other based on a polarization state, and outputting the second reception light component and the second transmission light in directions different from each other on one axis;

radiating each of the output first transmission light and the output second transmission light in a predetermined direction into an external space; and combining the output first reception light component and the output second reception light component for processing.

10. A transmission/reception method comprising:

irradiating first reception light and second reception light whose polarization states are orthogonal to each other;

separating the irradiated first reception light and the irradiated second reception light from each other depending on a polarization state;

generating transmission light;

modulating the generated transmission light into transmission light alternately including a first transmission light component having a polarization state orthogonal to the polarization state of the first reception light, and a second transmission light component having a polarization state orthogonal to the polarization state of the second reception light in a time-wise manner;

separating the modulated transmission light depending on a polarization state, and extracting the first transmission light component and the second transmission light component;

outputting the extracted first transmission light component and the separated first reception light in directions different from each other on one axis;

outputting the extracted second transmission light component and the separated second reception light in directions different from each other on one axis;

combining the output first transmission light component and the output second transmission light component to radiate the combined light into an external space; and processing the output first reception light and the output second reception light.

* * * * *